US009628583B2

(12) United States Patent
Fu

(10) Patent No.: US 9,628,583 B2
(45) Date of Patent: Apr. 18, 2017

(54) METHOD AND APPARATUS FOR COORDINATING SERVICE INFORMATION ACROSS MULTIPLE SERVER NODES

(75) Inventor: Yan Fu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1464 days.

(21) Appl. No.: 12/770,410

(22) Filed: Apr. 29, 2010

(65) Prior Publication Data

US 2011/0270909 A1 Nov. 3, 2011

(51) Int. Cl.
*G06F 15/16* (2006.01)
*H04L 29/08* (2006.01)

(52) U.S. Cl.
CPC ........ *H04L 67/306* (2013.01); *H04L 67/2814* (2013.01)

(58) Field of Classification Search
CPC . H04L 12/189; H04L 12/5895; H04L 61/307; H04L 61/3085; H04L 63/08; H04L 63/168; H04L 67/306
USPC ......................................... 709/219, 223, 225
See application file for complete search history.

(56) References Cited

U.S. PATENT DOCUMENTS

| | | | |
|---|---|---|---|
| 6,304,913 B1 | 10/2001 | Rune | |
| 6,421,714 B1 | 7/2002 | Rai et al. | |
| 6,496,855 B1 | 12/2002 | Hunt et al. | |
| 6,826,692 B1 | 11/2004 | White | |
| 7,117,528 B1 | 10/2006 | Hyman et al. | |
| 7,640,006 B2 * | 12/2009 | Portman et al. | 455/412.1 |
| 2001/0011274 A1 | 8/2001 | Klug et al. | |
| 2003/0040970 A1 * | 2/2003 | Miller | 705/26 |
| 2003/0093462 A1 | 5/2003 | Koskelainen | |
| 2004/0098507 A1 | 5/2004 | Thubert et al. | |
| 2004/0141005 A1 | 7/2004 | Banatwala et al. | |
| 2006/0067244 A1 * | 3/2006 | Sekaran et al. | 370/252 |
| 2006/0121919 A1 * | 6/2006 | Amishima et al. | 455/466 |
| 2007/0078785 A1 | 4/2007 | Bush et al. | |
| 2007/0203848 A1 | 8/2007 | Cameron et al. | |
| 2008/0059475 A1 | 3/2008 | Rowley | |
| 2008/0243845 A1 | 10/2008 | Wouhaybi et al. | |
| 2009/0299791 A1 | 12/2009 | Blake | |
| 2011/0047605 A1 * | 2/2011 | Sontag | G06F 21/32 726/7 |
| 2011/0154465 A1 * | 6/2011 | Kuzin et al. | 726/9 |

FOREIGN PATENT DOCUMENTS

| | | |
|---|---|---|
| CN | 101360111 | 2/2009 |
| EP | 0 830 773 B1 | 6/2004 |
| EP | 1 468 540 B1 | 6/2007 |

(Continued)

OTHER PUBLICATIONS

International Search Report for corresponding PCT Application No. PCT/FI2011/050343, Sep. 16, 2011, pp. 1-5.

(Continued)

*Primary Examiner* — Djenane Bayard
(74) *Attorney, Agent, or Firm* — Ditthavong & Steiner, P.C.

(57) ABSTRACT

An approach is provided for coordinating service information (e.g., account registration identifiers) across multiple server nodes. A server receives a request to register an identifier for an account. The server determines whether it is a home site for the identifier and processes the request based, at least in part, on the determination.

21 Claims, 8 Drawing Sheets

(56) References Cited

FOREIGN PATENT DOCUMENTS

EP           1 997 036  A2    12/2008
WO    WO 2007/096603  A2     8/2007

OTHER PUBLICATIONS

Written Opinion for corresponding PCT Application No. PCT/FI2011/050343, Sep. 16, 2011, pp. 1-8.
Office Action for corresponding Chinese Patent Application No. 201180021438.2 dated Jun. 3, 2015, with English-language summary, 5 pages.
Office Action for corresponding Chinese Patent Application No. 201180021438.2 dated Aug. 5, 2015, with English-language summary, 10 pages.
Office Action for corresponding Chinese Patent Application No. 201180021438.2, dated Feb. 3, 2016, with English-language summary, 9 Pages.
Office Action for corresponding Chinese Application No. 201180021438.2, dated Sep. 28, 2014, 18 pages (English Language Summary Included).
Supplementary European Search Report for corresponding Patent Application No. 11 77 4472 dated Oct. 1, 2013, 6 pages.

\* cited by examiner

METHOD AND APPARATUS FOR COORDINATING SERVICE INFORMATION ACROSS MULTIPLE SERVER NODES

BACKGROUND

Service providers and device manufacturers (e.g., wireless, cellular, etc.) are continually challenged to deliver value and convenience to consumers by, for example, providing compelling network services. Recent trends in providing and operating these network services include using multiple sites (e.g., multiple websites hosted by separate respective servers or server nodes) to provide access to the network services. By way of example, using multiple sites or server nodes allows for higher service availability, redundancies, etc., particularly when the sites are geographically distributed. For example, if one site is incapacitated (e.g., server failure, power failure, network connection loss, etc.), other sites will be forwarded the responsibilities of the incapacitated site to maintain service availability. Further, if a request from a user device is sent to the closest site to the user, latency due to transmission distance can be reduced, increasing user satisfaction. However, structurally, it is technically difficult to maintain consistency of information across the sites providing access to the network services. For example, services that rely on collecting user-specific service information (e.g., user registration information including user identifiers, user names, and the like) may encounter data consistency and/or integrity issues when communications among the sites or servers are disrupted during the data collection or registration process. Accordingly, service providers and device manufacturers face significant technical challenges to ensuring data consistency within a service distributed across multiple sites or server nodes.

SOME EXAMPLE EMBODIMENTS

Therefore, there is a need for an approach for efficiently coordinating service information (e.g., service registration information) across multiple sites or server nodes by registering a user identifier based on a home site of the identifier. A home site can be, e.g., a server for registering identifiers to accounts.

According to one embodiment, a method comprises receiving a request, at a server, to register an identifier for an account. The method also comprises determining whether the server is a home site associated with the identifier. The method further comprises causing, at least in part, processing of the request based, at least in part, on the determination.

According to another embodiment, an apparatus comprising at least one processor, and at least one memory including computer program code, the at least one memory and the computer program code configured to, with the at least one processor, cause, at least in part, the apparatus to receive a request, at a server, to register an identifier for an account. The apparatus is also caused to determine whether the server is a home site for the identifier. The apparatus is further caused to cause processing of the request based, at least in part, on the determination.

According to another embodiment, a computer-readable storage medium carrying one or more sequences of one or more instructions which, when executed by one or more processors, cause, at least in part, an apparatus to receive a request, at a server, to register an identifier for an account. The apparatus is also caused to determine whether the server is a home site for the identifier. The apparatus is further caused to cause processing of the request based, at least in part, on the determination.

According to another embodiment, an apparatus comprises means for receiving a request, at a server, to register an identifier for an account. The apparatus also comprises means for determining whether the server is a home site for the identifier. The apparatus further comprises means for causing, at least in part, processing of the request based, at least in part, on the determination.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for coordinating service information across multiple sites or server nodes are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
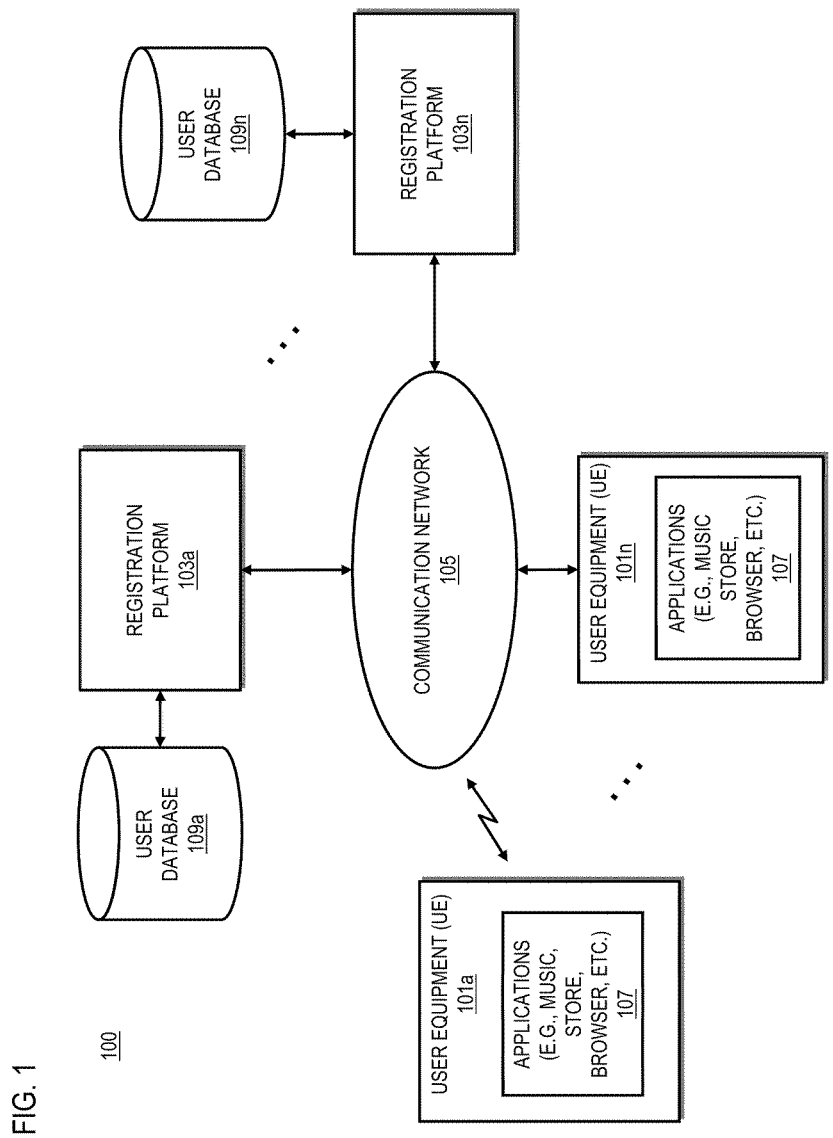
FIG. 1 is a diagram of a system capable of registering accounts based on identifiers across home sites, according to one embodiment.

FIG. 1 is a diagram of a system capable of registering accounts based on identifiers across home sites, according to one embodiment. As noted above, there are various advantages of separating the distribution of services across different sites or server nodes located at, for instance, different geographic locations. An example of services that can be utilized over multiple sites includes Single Sign On (SSO)

services. With these services, the user need only sign on once to access multiple services. These services may be provided by various sites (e.g., servers, server nodes, etc.) to improve service availability, performance, etc. Generally, with SSO services, logon procedures include registration at a single centralized site. However, if the centralized site is down, registration would not be available and users that may have wished to utilize the services may be discouraged and/or register with another service provider. As such, it is advantageous to have a multi-site SSO service.

However, various data consistency issues are raised in providing services across multiple sites. For example, the use and/or availability of a user identifier associated with an account may be different across sites between updates. As such, in building an infrastructure for SSO services across sites, one cannot assume that all sites can communicate with each other or a centralized site at all times. Thus, there may be occasions when connectivity breaks down between the sites. Further, when a user attempts to register an account (e.g., a new account) with a particular identifier (e.g., a user name) at an isolated site (e.g., a site or server node where communication with other sites within the multi-site service is disrupted), inconsistencies can be generated. As used herein, the term identifier refers to user identifier, username, unique identifier, unique user identifier, unique username, other identifiers (e.g., a security number, credit card number, phone number, etc.), etc. Although various embodiments are described with respect to username, it is contemplated that the approach described herein may be used with other identifiers or unique service information. Thus, it is technically difficult to determine the uniqueness of a user identifier associated with an account across all of the sites because another user may register the same user identifier at a different site while the isolated site cannot communicate with one or more of the other sites.

To address this problem, a system 100 of FIG. 1 introduces the capability to register accounts based on associating each existing or potential user-specified identifier with a specific home site among the multiple sites or server nodes available to support a specific service. In other words, on receiving a registration request, the system 100 determines whether the request is received at a home site for the identifier specified in the registration. If the request is received at a site that is not the home site for the identifier, then the system 100 forwards the request to the appropriate home site as determined by the identifier. In one embodiment, the system 100 applies a hash function on the requested identifier to determine from the output of the hash function which site among the multiple sites of the service is the home site for a particular identifier. By associating the identifier with a specific home site so that only the home site may process the registration request including the identifier, the system 100 ensures that the same identifier cannot be registered at multiple sites, thereby preserving data consistency and integrity by avoiding duplicate registrations of the same identifiers among the multiple sites when communications between one or more of the sites is disrupted.

A user of user equipment (UE) 101*a*-101*n* can request that a registration platform 103*a*-103*n* (e.g., a registration server) register an identifier (e.g., username) for an account over a communication network 105. The registration platforms 103 may be at different locations or sites. In certain embodiments, a site includes one or more of the registration platforms 103*a*-103*n* operating from a geographic location that may have connectivity to the communication network 105 to provide access to services (e.g., registration services). These sites can each include, provide, and/or support one or more services and be distributed geographically to increase reliability, redundancy, and reduce latency between queries from UEs 101. In one embodiment, each of the registration platforms 103 can provide registration services (e.g., for SSO services). Further, in certain scenarios, the registration platforms 103 may additionally provide one or more other services (e.g., music services, retail services, video services, advertising services, content serving services, tax services, game services, SSO services, etc.). As described above, registration of identifiers across the registration platforms 103 can be structured in a manner so that each registration platform 103 is responsible for a set of identifiers. As such, in certain embodiments, a registration platform 103 is a home site for a corresponding identifier if the registration platform 103 is responsible for the identifier (e.g., the identifier is included in the set of identifiers corresponding to the registration platform 103). Each home site can be responsible for processing the registration of an associated identifier.

A user of a UE 101 can utilize an application 107 (e.g., a web browser, music application, game application, etc.) to access registration via a registration platform 103*a*. The user may be forwarded to the registration platform 103*a* based on one or more criteria (e.g., distance from registration platform 103, language, services provided, a combination thereof, etc.). The user may request that an identifier (e.g., a unique user identifier, username, etc.) be associated with an account of the user. The registration process may be included in the creation of an account and/or assignment of a new identifier to an existing account.

The registration platform 103*a* receives the request to register the identifier for the account. The registration platform 103*a* then determines whether the registration platform 103*a* is a home site for the identifier. That is, whether the registration platform 103*a* is responsible for the registration of the identifier. This may be accomplished using an algorithm to determine which registration platform 103*a*-103*n* is responsible for registration of the identifier. A simple algorithm for such a decision may include setting limits (e.g., alphabetical limits, numerical limits, etc.) for which identifiers will be assigned to which home sites.

A more complex algorithm includes the use of a hash function to associate the possible identifiers, whether existing or not, to registration platforms 103*a*-103*n* as home sites. For example, if there are two registration platforms 103, a simple hash function could include identifier % 2 to assign identifiers to registration platforms 103. In this example, if registration platform 103*a* was associated with identifiers that when modulo of the identifier is taken ends in 0, and registration platform 103*n* was associated with identifiers that when modulo of the identifier is taken ends in 1, the identifier "100" would be assigned to registration platform 103*a*. Characters, integers, short integers, long integers, unsigned integers, floating values, and other computerized representations can be used to represent the identifier or username. Additionally, if one type of data structure is utilized to represent identifiers, it may be converted into another type of data structure for performing the modulo operation. Moreover, in certain embodiments, more than one hash can be assigned to a home site. For expansion purposes, even though currently there are only a certain number of registration platforms 103 to be used as home sites, the divisor of the modulo operation may be larger. For example, identifier % n may be used to determine n sets of home site options. Then, the n sets can be assigned to home sites. In the scenario that n=8 and there are two home sites, one home site may be assigned, for example, 0, 2, 4, and 6 while the other home site is assigned 1, 3, 5, and 7. If a third home site is added later, the sets may be redistributed accordingly.

In one embodiment, a username can only be assigned to an account via the home site of the username. Thus, in the previous example, if a user attempts to register username "100," at registration platform 103a, the processing of the request can occur locally at registration platform 103a because the registration platform 103a determines that it is the home site responsible for the username "100." However, if the user attempts to register the username "101" at registration platform 103a, when the registration platform 103a determines whether the registration platform 103a is the home site of the username, it determines that registration platform 103a is not the home site of the username "101". In this scenario, registration platform 103a can determine that the home site is registration platform 103n. This may be accomplished by looking up the location of the home site for the username via the algorithm (e.g., via a hash and a lookup table associating the remainder to a particular home site). When the home site is found, the request can be forwarded to the home site, which in this case is registration platform 103n. Then, registration platform 103n is caused to process the request. If the registration platform 103n that is the home site of the username cannot be reached, then the registration platform 103a conducting the registration process may suggest similar usernames that the registration platform 103a is a home site for (e.g., "1010," "1012," etc.) and/or explain to the user that the requested username is unavailable.

During the processing of the request, the registration platform 103a determines whether the username is unique. To determine whether the username is unique (e.g., not associated with another account), the registration platform 103a can compare the username with a user database 109. Each registration platform 103 can have associated with it a user database 109a-109n. The registration platforms 103 can send updates of the user databases 109 to each other over the communication network 105 of new associations of usernames (e.g., via account creation, registering additional usernames to existing accounts, etc.). Because the registration platform 103a is the home site, the registration platform 103a can be assured that another registration platform 103 has not registered the username to an account.

If the username is determined to be unique and/or unused, the username is registered to the account. In certain embodiments, the account is created and the user may be prompted to fill out additional information associated with the account creation process.

If the username is determined to be not unique (e.g., used, previously registered, etc.), the registration platform 103a can generate one or more usernames or other identifiers as suggested usernames (e.g., usernames that are determined to be unique and assigned to the registration platform 103a as the home site). In communication to the user, the registration platform 103a may send a message to the UE 101 of the user stating that the requested username is reserved (e.g., unavailable, used, etc.). The user can then prompted to select one of the suggested usernames. The registration platform 103a receives the selection from the user's UE 101 and causes registration of the selected identifier. One or more of the previously described processes may be utilized in ensuring that the selected identifier is unique and/or is associated with the registration platform 103a as its home site.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101s and registration platforms 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
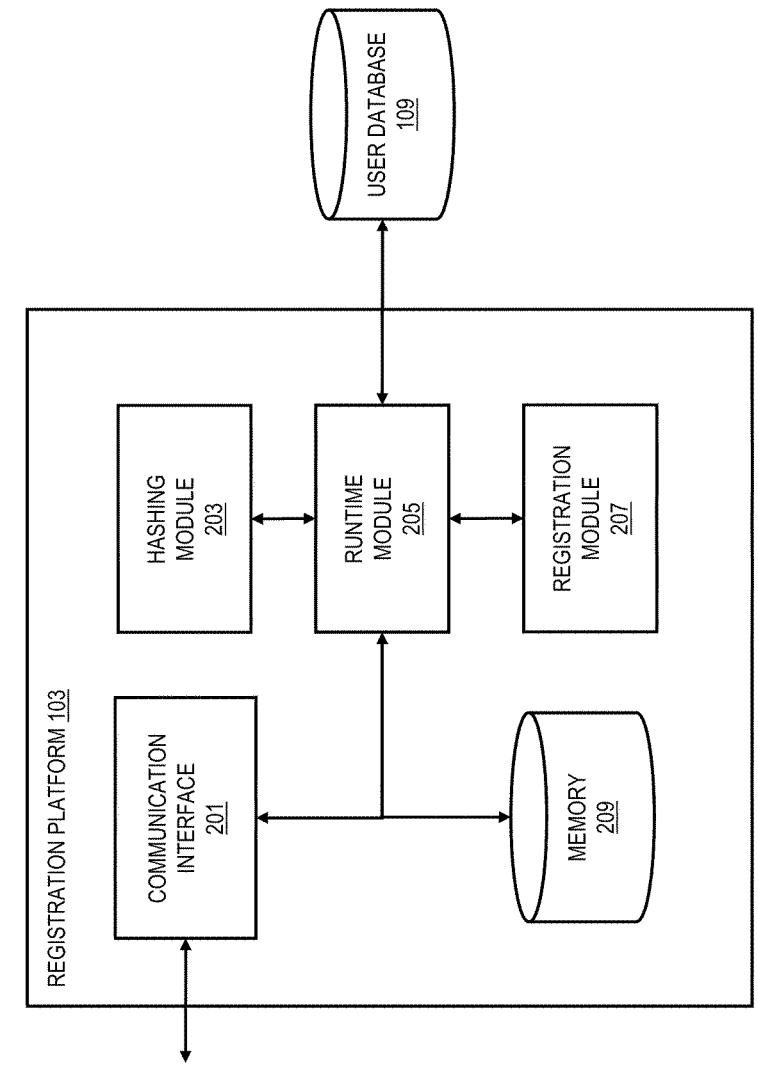
FIG. 2 is a diagram of the components of a registration platform, according to one embodiment.

FIG. 2 is a diagram of the components of a registration platform, according to one embodiment, according to one embodiment. By way of example, the registration platform 103 includes one or more components for providing registration processing for one or more services. It is contemplated that the functions of these components may be combined in one or more components or performed by other components of equivalent functionality. In this embodiment, the registration platform 103 includes a communication interface 201 to communicate via the communication network 105, a hashing module 203 to determine the home site for an identifier, a runtime module 205 for controlling the execution of processes of the registration platform 103, a registration module 207 to coordinate the registration of identifiers (e.g., usernames) to accounts. Moreover, it is noted that the registration platform 103 may additionally incorporate other features and provide other services and/or be incorporated in another platform. For example, a services platform that provides services (e.g., SSO services) can include the registration platform 103.

The communication interface 201 can be used to communicate with a UE 101. The registration platform 103 can receive information from the UE 101 via the communication interface 201 via methods such as internet protocol, MMS, SMS, GPRS, or any other available communication method. The UE 101 can send information to the registration platform 103 for many reasons, such as to provide an identifier to register with an account. Further, the runtime module 205 may utilize the communication interface 201 to receive registration information to perform registration services. Moreover, the communication interface 201 can be utilized to connect to other registration platforms 103. In this manner, a request to register an identifier can be forwarded to another account.

Further, the runtime module 205 can utilize the communication interface to communicate with other registration platforms 103 to update a user database 109. By way of example, the user database 109 may include a list of user identifiers and associated accounts. The list of user identifiers may include user identifiers across home sites so that the user database 109 can include updated identifiers based on a particular update time. Further, the runtime module 205 can update a particular user identifier and/or account based on a registration of the identifier via a registration module 207.

The runtime module 205 can receive requests from a UE 101 to register an identifier via the communication interface 201. Then, the runtime module 205 can utilize the hashing module 203 to determine a home site associated with the identifier. For example, the hashing module 203 can use one or more algorithms (e.g., a hashing algorithm) to determine the home site associated with the identifier. As such, the hashing module 203 can be a means for determining the home site for the identifier. Further, the hashing module 203 may additionally utilize a lookup table to associate the identifier with its home site. In certain embodiments a lookup table or other information used to determine home sites for identifiers can be stored in the memory 209. Thus, the hashing module 203 can be a means for determining the home site for an identifier.

If the registration platform 103 is the home site for an identifier to be registered, the registration module 207 initiates processing of the registration. Thus, the registration module 207 can cause registration of the identifier with an account. This may include creation of the account and/or adding or replacing an existing identifier associated with the account with another identifier. As such, the registration module 207 can be a means for causing processing of the registration request.

Figure 3:
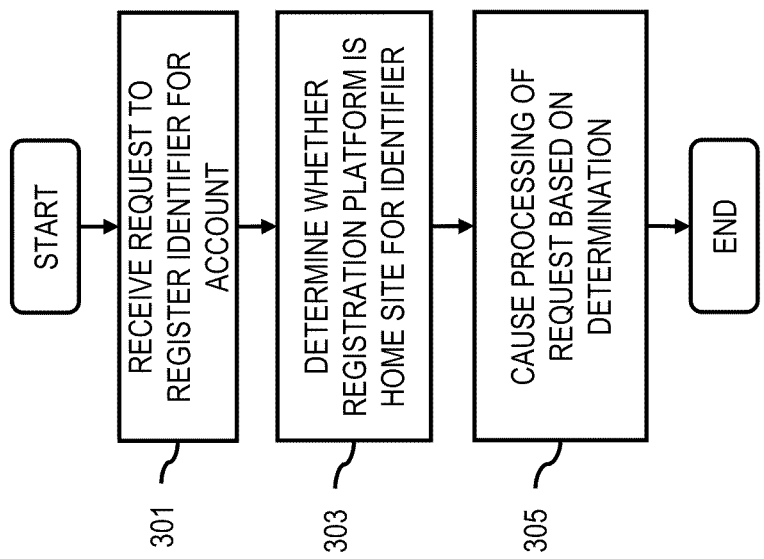
FIG. 3 is a flowchart of a process for causing registration of an identifier to an account, according to one embodiment.
Figure 7:
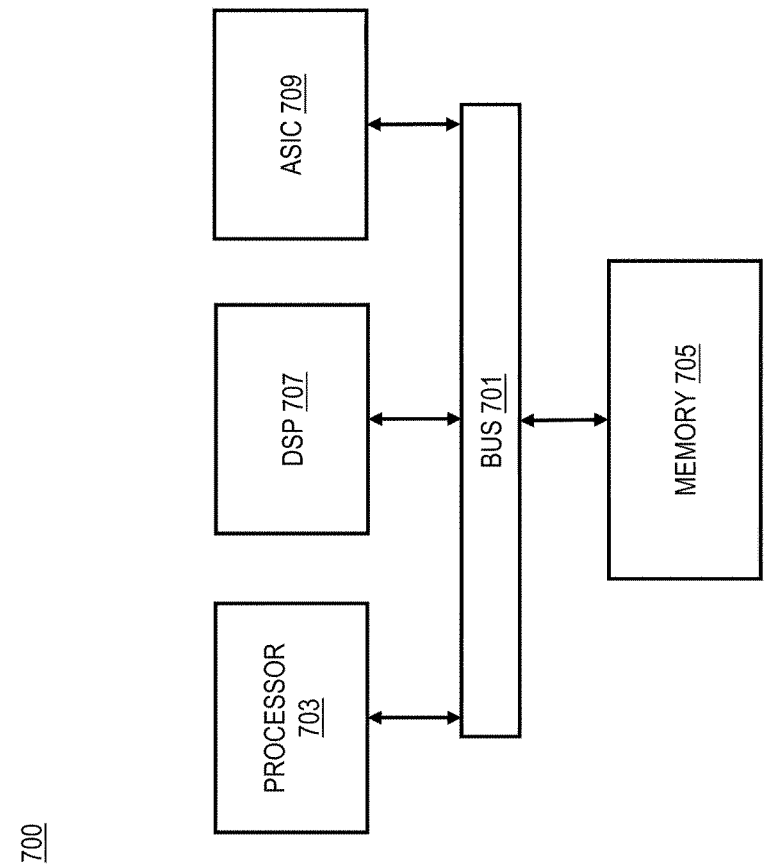
FIG. 7 is a diagram of a chip set that can be used to implement an embodiment of the invention.

FIG. 3 is a flowchart of a process for causing registration of an identifier to an account, according to one embodiment. In one embodiment, the runtime module 205 of the registration platform 103 performs the process 300 and is implemented in, for instance, a chip set including a processor and a memory as shown in FIG. 7. As such, the registration platform 103, its components, and/or other components of other registration platforms 103 can provide means for accomplishing various parts of the process 300 as well as means for accomplishing other processes.

In step 301, the runtime module 205 receives a request to register an identifier for an account. The request may be based on a prompt to register with a service and/or a request initiated by a UE 101. In one example, the request may be to create an account for a service. The request may specify an identifier to register with the account. One or more messages may be sent from the user's UE 101 for the request.

Based on the request, the runtime module 205, via the hashing module 203 determines whether the registration platform 103 is a home site for the identifier (step 303). As noted above, a home site can be the registration platform 103 responsible for the registration of an identifier. In certain embodiments, the registration platform 103 is considered a home site for identifiers that have been determined to be associated with the registration platform 103 via, for instance, the hashing module 203. As such, in these embodiments, only the home site of the identifier is allowed to add the identifier to an account. In this manner, updates to the user database 109 corresponding to the identifiers associated with accounts can be maintained consistently across multiple sites (e.g., server nodes). One or more algorithms (e.g., a hashing algorithm, a partitioning algorithm, etc.) as previously detailed can be used to determine whether the registration platform 103 is the home site for the identifier. Further, one or more algorithms may be utilized to determine the home site for the identifier. The determination can be made with the identifier as the input and a home site or a home site reference (e.g., a hash value that can be associated with the home site) as the output. A home site reference can be tied to a home site with the use of a lookup table or another method of associating home site references to home sites (e.g., via addresses used to communicate with registration platforms 103, etc.).

At step 305, the runtime module 205 can cause processing of the request based, at least in part, on the determination of whether the registration platform 103 is the home site for the identifier. In one scenario, it is determined that the registration platform 103 is not the home site for the identifier. In this scenario, the request can be caused to be transmitted to the home site for the identifier to process the request. In another scenario, it is determined that the registration platform 103 is the home site for the identifier. In this scenario, the registration platform 103 processes the request as further detailed in the processes of FIG. 4.

Figure 4:
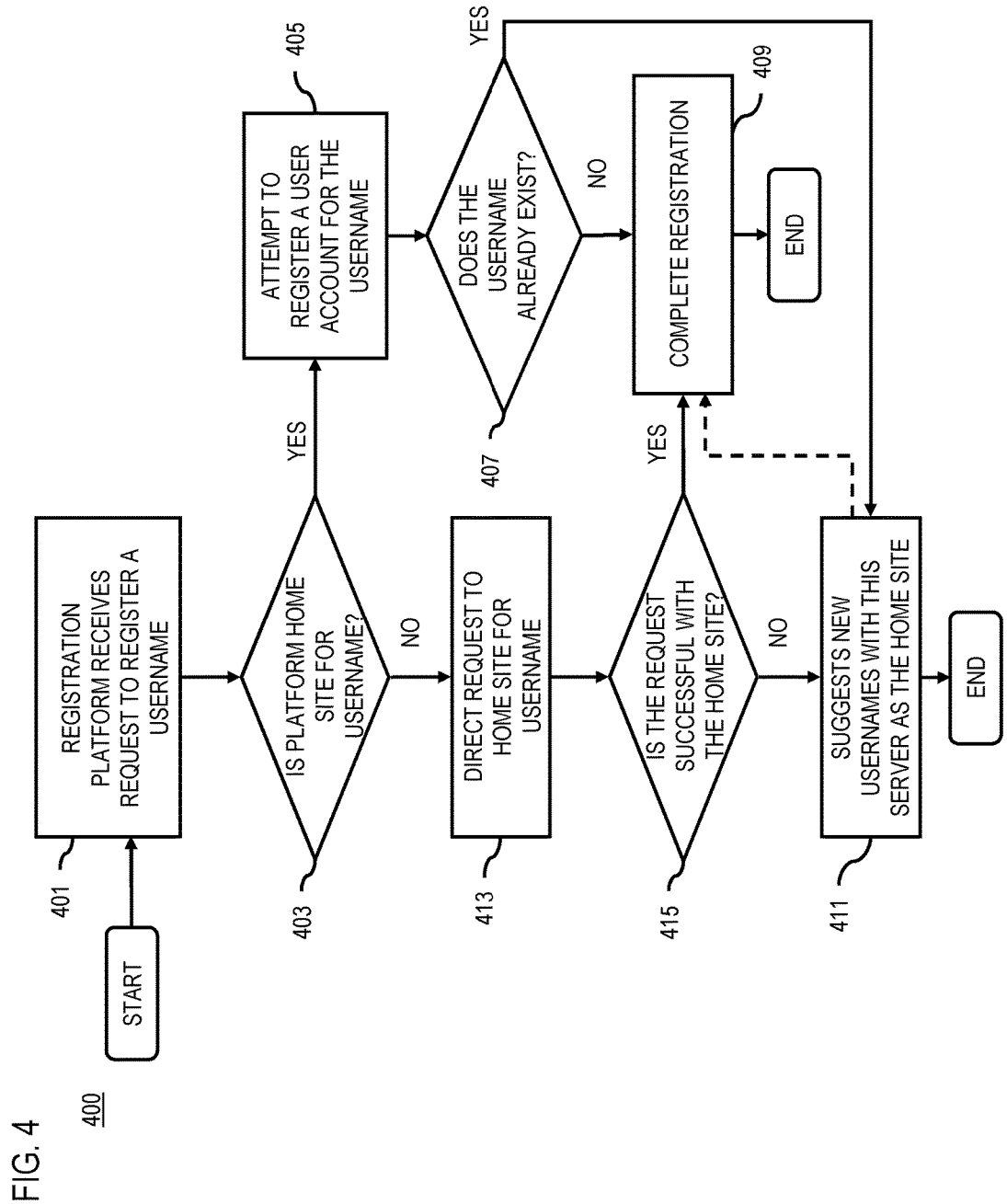
FIG. 4 is a flowchart of a process for causing registration of an identifier to an account, according to one embodiment.

FIG. 4 is a flowchart of a process for causing registration of an identifier to an account, according to one embodiment. In one embodiment, the runtime module 205 of a registration platform 103 performs the process 400 and is implemented in, for instance, a chip set including a processor and a memory as shown in FIG. 7. As such, the registration platform 103, its components, and/or other components of other registration platforms 103 can provide means for accomplishing various parts of the process 400 as well as means for accomplishing other processes.

At step 401, the registration platform 103 receives a request to register a username. The request can include a request for a new account to be associated with the username and/or to associate the username with an existing account. Further, the request may be in response, e.g., to a request from a service or the registration platform 103. Moreover, the request may specify the username. In one scenario, the request may be to add the username to a preexisting account. In this scenario, the user may logon to the preexisting account and request to add another user identifier to the account. One advantage of such registering of a username can be to register additional products with an account (e.g., the user may be utilizing an instant messaging service and the user would like to associate one username with work and another username with family, friends, etc.).

Then, the runtime module 205 determines whether the registration platform 103 is the home site of the username (step 403). As previously noted, one or more algorithms may be utilized in the determination. For example, a hashing function may be utilized in determining whether the registration platform 103 is the home site for the username. Additionally or alternatively, additional logic can be utilized in the registration platform 103 to determine home sites. The additional logic can be a part of the structure that defines the system of registration platforms 103 across sites. This additional logic may be used, for example, to sort usernames based on a prefix.

For example, the username "myemailaddress" may be presorted based on "my" before the hashing of the username. In this example, the usernames with these prefixes may be assigned to one of a subset of home sites. Further, the prefix may be used to determine a type of name. For example, the prefix, the type of associated data structure to the username, etc. can be used to determine a type of language associated with the username. Thus, if the username can be identified to be associated with the Chinese language, the available home sites for the username can be restricted to Chinese language countries. Further, the usernames can then be hashed to this subset of possible home sites. Identifying a language associated with the username can be determined based on a type of data structure (e.g., one for Chinese characters, Arabic alphabet, etc.), associated with the username.

One benefit of mapping home sites that are likely to be used by a Chinese person is that Chinese users would normally be routed to the registration platform 103 and/or other services platforms in China or otherwise designated to support requests originating from China rather than those platforms associated with other countries. For example, the user's UE 101 may be automatically associated with a Chinese registration platform 103 and/or other services platform when the user attempts to access services. By automatically grouping identifiers more likely to be present in that location (e.g., China), it is more likely that the registration platform 103 that the user is directed towards on initial contact is a home site for the user's selected identifier. Thus, latency of registration can be limited because there may be less need to contact another registration platform 103 to register such an identifier. Further, this approach can lead to a more an advantageous user experience because the user may experience a shorter observed latency and better success rates (e.g., higher rates of successful registrations). This example has been specific to China, however, as one skilled in the art would be able to ascertain, this may additionally be performed in other regions, areas, and/or countries.

In one example, the username ZhangQiang can be associated with a Chinese registration platform 103 due to a probability that the last name Zhang is associated with China. This may be accomplished by collecting survey information about surnames in various locations and using this survey information, other collected information, database information from third-party information sources (e.g., websites), databases of naming and/or census information, a combination thereof, etc. By contrast, the username "John-Smith" may be associated with the United States if supported by the survey or other information, or may not be grouped at all if the survey or other information indicates the likelihood that the last name Smith is generic and not specific to a particular location.

If the registration platform 103 is the home site for the username, the runtime module 205 and/or registration module 207 attempts to register the username with an account (step 405). This may be a part of processing of the request. During the registration attempt, the user queries its user database 109 to determine whether the username already exists (step 407). As such, the runtime module 205 determines whether the username is unique as compared to the list of usernames already in use in the user database 109. Because the registration platform 103 is the home site for the username, the runtime module 205 knows that the addition of the username is not inconsistent with other sites.

If the username does not exist in the user database 109, at step 409, the runtime module 205 causes completion of the registration of the username to the account. If the username does not exist in the user database 109, the username may be considered unique. If the account is new, this may include creation and registration steps in creating the account. As such, the user may be asked to provide additional information (e.g., first name, last name, e-mail address, phone number, etc.), link devices to the account, select services (e.g., from a list of SSO services associated with the registration platform 103), etc. Creation of the account may include adding an additional database entry for the account and associating the username to the account. Additionally or alternatively, if the account is not new, the username can be assigned to the account (e.g., by associating an existing database entry to include the username as a replacement identifier or an additional identifier). When the user database 109 is updated, the registration platform 103 can send other registration platforms 103 information about the updates.

If the username already exists (e.g., assigned to another account), the runtime module 205 causes suggestion of new usernames with the current registration platform 103 as the home site (step 411). As such, the runtime module 205 determines one or more other usernames for which the registration platform 103 is the home site. These usernames may be based on a similarity to the originally requested username. For example, if the username "USERNAME" is taken, the usernames "USERNAME1" or "USERNAME-BIRTHDATEYEAR" can be recommended. One or more algorithms, which may use additional user information (e.g., birthdates, nicknames, etc.), may be utilized in determining the one or more suggested usernames. The suggestion may also include a reason for or notification that the username has been taken (e.g., reserved, unavailable, currently unavailable, etc.). If the user selects one of these usernames without modification, the registration can be completed (step 409). Alternatively or additionally, the user may be provided a field to choose another username. This can cause the runtime module 205 to perform the process 400 starting with step 401 with the newly selected username as the requested username.

Referring back to step 403, if, the registration platform 103 is not the home site for the username, the request is directed to the home site for the username (step 413). As such, the runtime module 205 can cause, at least in part, transmission of the request to another registration platform 103n that is the home site for the username to process the request. The other registration platform 103n can be determined via the algorithm used to determine the home site of the username. Further, an address of the other registration platform 103n can be associated as a result of the algorithm and/or via a lookup table. If the transmission is successful, the other registration platform 103n can perform one or more of the steps of process 400 starting at step 401.

Then, at step 415, the runtime module 205 determines whether the request to the other registration platform 103n was successful. In one embodiment, the determination can be based on whether the transmission failed. The transmission may have failed if the runtime module 205 determines that it cannot connect to the other registration platform 103n. Further, the request may have failed if an acknowledgement of the request is expected and not received within a timeout. If the transmission is complete, the other registration platform 103n can be responsible for processing of the request until the registration is complete (step 409).

If the transmission fails (e.g., because the other registration platform 103n that is the home site for the username is unavailable), the runtime module 205 can suggest new usernames with the registration platform 103 as the home site (step 411) as previously described.

Figure 5A:
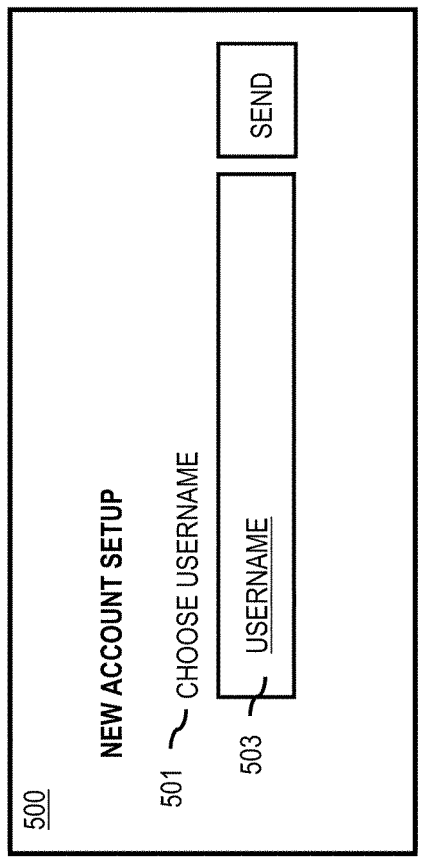
FIGS. 5A-5B are diagrams of user interfaces utilized in the processes of FIGS. 3 and 4, according to various embodiments.
Figure 5B:
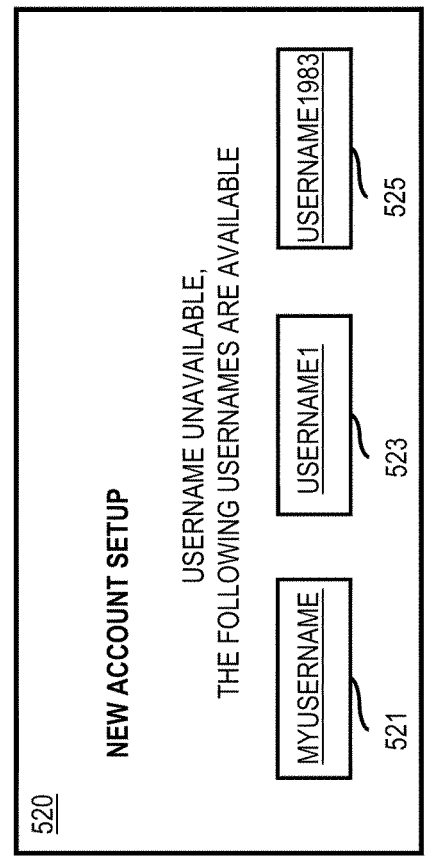

FIGS. 5A-5B are diagrams of user interfaces utilized in the processes of FIGS. 3 and 4, according to various embodiments. User interface 500 presents an option to the user of the UE 101 to create a new account. The user interface 500 additionally allows for the user to choose a user identifier 501 and enter the username in a field 503. This username can then be transmitted to a registration platform 103 associated with the new account setup. The registration platform 103 can then process the request in the manner detailed in the processes of FIGS. 3 and 4.

FIG. 5B shows a user interface 520 of the scenario of when the username requested by the user is unavailable (e.g., because the registration platform 103 is unable to connect to a home site of the requested username, the username is assigned to another user, etc.). In this scenario, the registration platform 103 can cause presentation of alternative usernames 521, 523, 525. These usernames can be usernames wherein the registration platform 103 in communication with the UE 101 is the home site. That is, the home site of the usernames presented may be the registration platform 103. Further, these usernames can be checked for availability prior to presentation.

With the above approaches, consistency between registration platforms 103 for the use of identifiers is maintained. As noted, the use of multiple registration platforms 103 allows for a more robust registration system with backups if one registration platform 103 is unavailable. As such, users that may wish to register with the registration platform 103 will not be discouraged if the registration platform 103 is unavailable because another registration platform 103 perform the same operations seamlessly. The use of assigning home sites to identifiers allows for database integrity to be maintained while allowing for registration of identifiers across various sites.

The processes described herein for providing registration of accounts based on identifiers across home sites may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
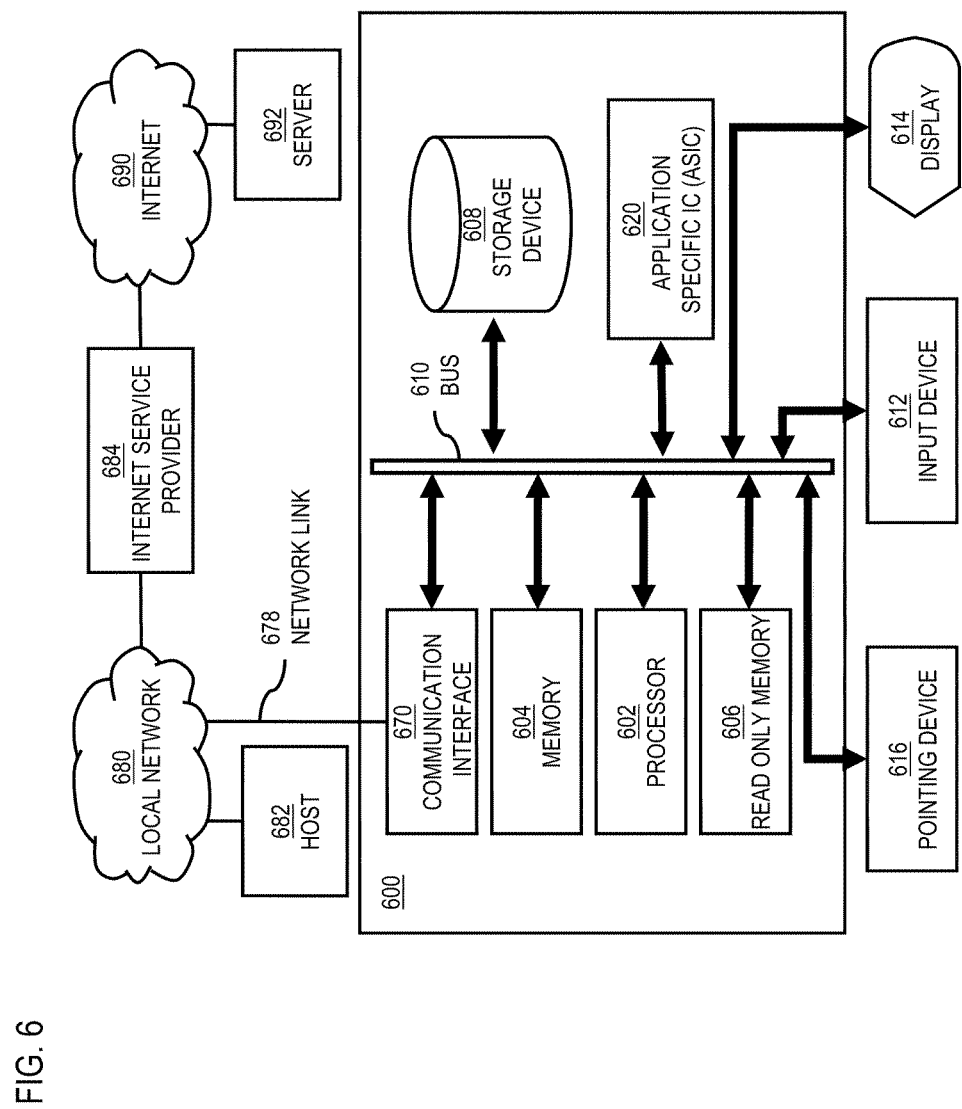
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to register identifiers with accounts as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of registering identifiers with accounts.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to register identifiers with accounts. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for registering identifiers with accounts. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for registering identifiers with accounts, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to register identifiers with accounts as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of registering identifiers with accounts.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to register identifiers with accounts. The memory 705 also stores the data associated with or generated by the execution of the inventive steps.

Figure 8:
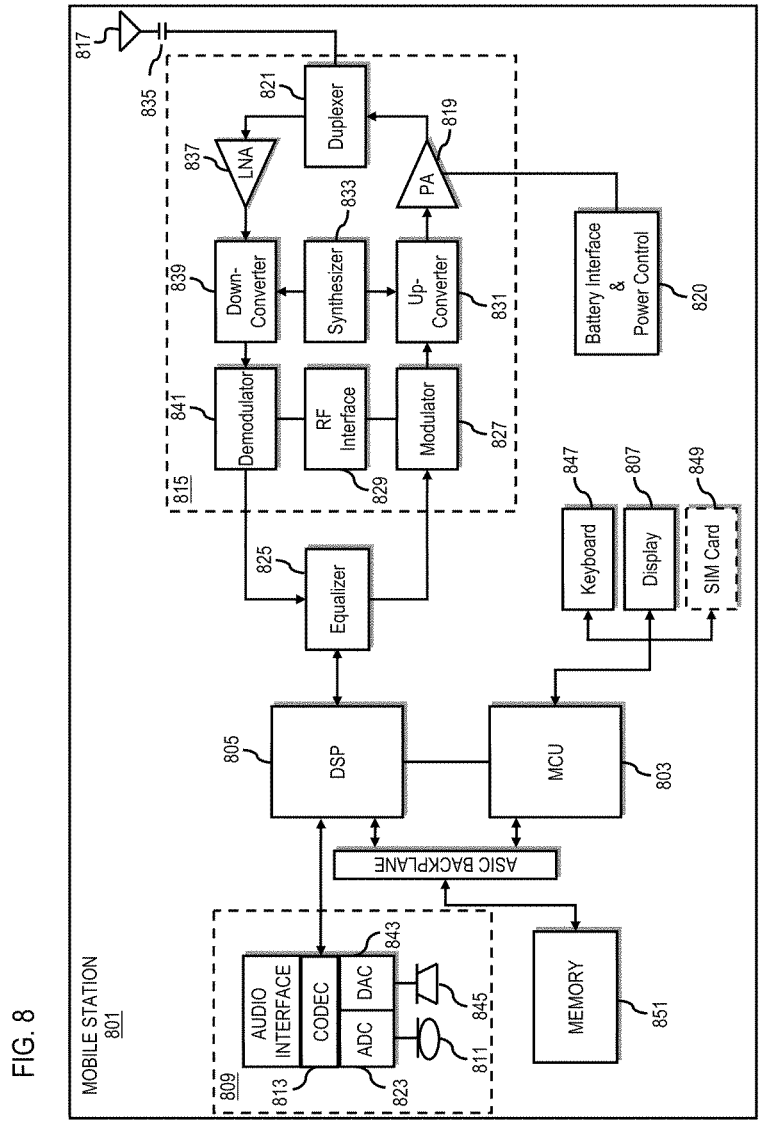
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of performing registration processes (e.g., generating and transmitting a request for registering an identifier with an account). Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of registering one or more identifiers with one or more registration platforms 103. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission through the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to register one or more identifiers with one or more accounts. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request at a server, to register an identifier for creating a new account for a multi-site service based, at least in part, on a prompt from a user's equipment, wherein the multi-site service is supported by a plurality of server nodes and wherein the plurality of server nodes includes the server;
   determining a home site for the identifier based, at least in part, on a hash of the identifier, wherein the home site is a server node included among the plurality of server nodes and wherein the home site is responsible for registering the identifier to create the new account for the user's equipment within the multi-site service;
   determining whether the server is the home site for the identifier based on the hash; and
   causing, at least in part, processing of the request based, at least in part, on the determination, wherein the identifier is entered by a user at the prompt.

2. The method of claim 1, wherein the determination is that the server is not the home site for the identifier, the method further comprising:
   causing, at least in part, transmission of the request to another server that is the home site for the identifier to process the request.

3. The method of claim 2, further comprising:
   determining that the transmission failed;
   presenting a notification that the identifier is unavailable for creating the new account;
   determining one or more other identifiers for which the server is the home site; and
   presenting the one or more other identifiers as one or more suggested identifiers for creating the new account at the server.

4. The method of claim 1, wherein the processing of the request includes registration of the identifier to create the new account by the home site.

5. The method of claim 1, wherein the determination is that the server is the home site for the identifier, the method further comprising:
   determining that the identifier is unique, wherein the processing of the request includes registering the identifier to create the new account.

6. The method of claim 1, wherein the determination is that the server is the home site for the identifier, the method further comprising:
   determining that the identifier is not unique; and
   determining one or more other identifiers for which the server is the home site.

7. The method of claim 6, further comprising:
   selecting one of the one or more other identifiers,
   wherein the processing of the request further includes causing registration of the one of the one or more other identifier to create the new account.

8. The method of claim 1, wherein the identifier cannot be registered to create the new account at another server of the multi-site service that is not the home site.

9. An apparatus comprising:
   at least one processor; and
   at least one memory including computer program code for one or more programs,
   the at least one memory and the computer program code configured to, with the at least one processor, cause the apparatus to perform at least the following:
      receive a request at a server, to register an identifier for creating a new account for a multi-site service based, at least in part, on a prompt from a user's equipment, wherein the multi-site service is supported by a plurality of server nodes and wherein the plurality of server nodes includes the server;
      determine a home site for the identifier based, at least in part, on a hash of the identifier, wherein the home site is a server node included among the plurality of server nodes and wherein the home site is responsible for registering the identifier to create the new account for the user's equipment within the multi-site service;
      determine whether the apparatus is the home site for the identifier based on the hash; and
      cause, at least in part, processing of the request based, at least in part, on the determination, wherein the identifier is entered by a user at the prompt.

10. The apparatus of claim 9, wherein the determination is that the apparatus is not the home site for the identifier, and wherein the apparatus is further caused to:
    cause, at least in part, transmission of the request to another server that is the home site for the identifier to process the request.

11. The apparatus of claim 10, wherein the apparatus is further caused to:
    determine that the transmission failed;
    present a notification that the identifier is unavailable for creating the new account;
    determine one or more other identifiers for which the apparatus is the home site; and
    present the one or more other identifiers as one or more suggested identifiers for creating the new account at the server.

12. The apparatus of claim 9, wherein the processing of the request includes registration of the identifier to create the new account by the home site.

13. The apparatus of claim 9, wherein the determination is that the apparatus is the home site for the identifier, and wherein the apparatus is further caused to:

determine that the identifier is unique, wherein the processing of the request includes registering the identifier to create the new account.

14. The apparatus of claim 9, wherein the determination is that the apparatus is the home site for the identifier, and wherein the apparatus is further caused to:
   determine that the identifier is not unique; and
   determine one or more other identifiers for which the apparatus is the home site.

15. The apparatus of claim 14, wherein the apparatus is further caused to:
   select one of the one or more other identifiers,
   wherein the processing of the request further includes causing registration of the one of the one or more other identifier to create the new account.

16. The apparatus of claim 9, wherein the identifier cannot be registered to create the new account at another server of the multi-site service that is not the home site.

17. A non-transitory computer-readable storage medium carrying one or more sequences of one or more instructions which, when executed by one or more processors, cause an apparatus to at least perform the following steps:
   receiving a request at a server, to register an identifier for creating a new account for a multi-site service based, at least in part, on a prompt from a user's equipment, wherein the multi-site service is supported by a plurality of server nodes and wherein the plurality of server nodes includes the server;
   determining a home site for the identifier based, at least in part, on a hash of the identifier, wherein the home site is a server node included among the plurality of server nodes and wherein the home site is responsible for registering the identifier to create the new account for the user's equipment within the multi-site service;
   determining whether the server is the home site for the identifier based on the hash; and
   causing, at least in part, processing of the request based, at least in part, on the determination, wherein the identifier is entered by a user at the prompt.

18. The non-transitory computer-readable storage medium of claim 17, wherein the determination is that the apparatus is not the home site for the identifier, and wherein the apparatus is further caused to perform:
   causing, at least in part, transmission of the request to another server that is the home site of the identifier to process the request.

19. The non-transitory computer-readable storage medium of claim 18, wherein the apparatus is further caused to perform:
   determining that the transmission failed;
   presenting a notification that the identifier is unavailable for creating the new account;
   determining one or more other identifiers for which the server is the home site; and
   presenting the one or more other identifiers as one or more suggested identifiers for creating the new account at the server.

20. The non-transitory computer-readable storage medium of claim 17, wherein the processing of the request includes registration of the identifier to create the new account by the home site.

21. The non-transitory computer-readable storage medium of claim 17, wherein the identifier cannot be registered to create the new account at another server of the multi-site service that is not the home site.

* * * * *